(12) United States Patent
Paterra et al.

(10) Patent No.: US 10,319,414 B2
(45) Date of Patent: Jun. 11, 2019

(54) DATA STORAGE ENCLOSURE WITH ACOUSTIC BAFFLE

(71) Applicant: Seagate Technology LLC, Cupertino, CA (US)

(72) Inventors: Kevin Paterra, Longmont, CO (US); Kevin Van Pelt, Longmont, CO (US); Sean Kupec, Cedar Park, TX (US)

(73) Assignee: Seagate Technology LLC, Cupertino, CA (US)

( * ) Notice: Subject to any disclaimer, the term of this patent is extended or adjusted under 35 U.S.C. 154(b) by 130 days.

(21) Appl. No.: 15/277,019

(22) Filed: Sep. 27, 2016

(65) Prior Publication Data

US 2018/0090181 A1    Mar. 29, 2018

(51) Int. Cl.
| | |
|---|---|
| *G11B 33/14* | (2006.01) |
| *G11B 33/02* | (2006.01) |
| *G06F 1/20* | (2006.01) |
| *G11B 33/08* | (2006.01) |
| *G06F 1/18* | (2006.01) |

(52) U.S. Cl.
CPC .......... *G11B 33/1486* (2013.01); *G06F 1/181* (2013.01); *G06F 1/20* (2013.01); *G06F 1/206* (2013.01); *G11B 33/022* (2013.01); *G11B 33/08* (2013.01); *G11B 33/142* (2013.01)

(58) Field of Classification Search
CPC .............. G11B 33/1486; G11B 33/022; G11B 33/1406; G06F 1/20
USPC ..... 361/679.48; 181/286–287, 212, 290, 225
See application file for complete search history.

(56) References Cited

U.S. PATENT DOCUMENTS

| | | |
|---|---|---|
| 5,596,483 A | 1/1997 | Wyler |
| 6,146,565 A | 11/2000 | Keller |
| 6,301,105 B2 | 10/2001 | Glorioso et al. |
| 6,313,990 B1 | 11/2001 | Cheon |
| 6,493,221 B2 | 12/2002 | Harrison et al. |
| 6,646,876 B2 | 11/2003 | Carr et al. |
| 6,674,609 B2 | 1/2004 | Boutaghou |
| 6,775,136 B2 | 8/2004 | Tozune et al. |
| 7,382,632 B2 | 6/2008 | Alo et al. |
| 7,535,707 B2 | 5/2009 | Seibold |
| 7,712,576 B2 * | 5/2010 | Goto ........................ G06F 1/182  181/200 |
| 7,872,865 B2 * | 1/2011 | Matsushima ........ G11B 33/142  165/104.33 |
| 8,081,444 B2 | 12/2011 | Xiao et al. |
| 8,279,595 B2 * | 10/2012 | Ishimine ................... G06F 1/20  312/236 |
| 8,701,821 B2 * | 4/2014 | O'Coimin .......... H05K 7/20736  181/224 |
| 9,408,330 B2 * | 8/2016 | Cruz ......................... G06F 1/20 |

(Continued)

*Primary Examiner* — Rockshana D Chowdhury
(74) *Attorney, Agent, or Firm* — Hall Estill Attorneys at Law (57) ABSTRACT

A data storage enclosure can employ an acoustic baffle for the purpose of reducing performance degradation in a data storage device, such as a rotating medium hard disk drive. A storage enclosure may house a plurality of data storage devices and at least one cooling feature. One or more acoustic baffles may be positioned between the at least one cooling feature and the plurality of data storage devices. The acoustic baffle can separate a first sound pressure region that is proximal the at least one cooling feature from a second sound pressure region that is proximal the plurality of data storage devices.

17 Claims, 7 Drawing Sheets

(56) References Cited

U.S. PATENT DOCUMENTS

| | | | |
|---|---|---|---|
| 2003/0156385 A1* | 8/2003 | Askeland | G06F 1/182 361/679.51 |
| 2010/0018798 A1* | 1/2010 | Jeon | E02F 9/00 181/225 |
| 2010/0290182 A1 | 11/2010 | Baitz et al. | |
| 2011/0175504 A1* | 7/2011 | Cook | H05K 7/20572 312/236 |
| 2015/0122577 A1* | 5/2015 | Zalewski | G10K 11/172 181/290 |
| 2016/0139001 A1* | 5/2016 | Tran | F01D 15/10 73/116.03 |
| 2017/0160771 A1* | 6/2017 | Albrecht | G06F 1/206 |

* cited by examiner

DATA STORAGE ENCLOSURE WITH ACOUSTIC BAFFLE

SUMMARY

A data storage enclosure, in some embodiments, houses a plurality of data storage devices and at least one cooling feature. One or more acoustic baffles are positioned between the at least one cooling feature and the plurality of data storage devices. The acoustic baffle separates a first sound pressure region that is proximal the at least one cooling feature from a second sound pressure region that is proximal the plurality of data storage devices.

DETAILED DESCRIPTION

The current disclosure provides assorted non-limiting embodiments generally directed to a data storage system that employs a data storage enclosure having an acoustic baffle.

As industry and consumers strives for greater data storage capacity, increased numbers of data storage devices are housed in a data storage enclosure. Higher numbers of data storage devices, such as solid-state, rotating disk, and hybrid devices, produce heightened amounts of heat, which can degrade the data storage performance of a data storage system. To mitigate the production of heat, cooling features, such as fans, heatsinks, and intercoolers, can be utilized in a data storage enclosure. However, the use of cooling features can produce acoustic characteristics, such as sound pressure, sound level, and sound power, that degrade data storage device performance.

With these issues in mind, various embodiments position at least one acoustic baffle in a data storage enclosure to decrease the acoustic characteristics produced by the cooling feature(s). By tuning the material, geometry, size, and position of an acoustic baffle, the acoustic effects of cooling features on a data storage device can be reduced while allowing sufficient cooling to maintain continual, optimal operation of the assorted data storage devices in a data storage enclosure. A customaized acoustic baffle also allows for more powerful cooling features to be utilized, and increased amounts of acoustic characteristics to be produced upstream from the acoustic baffle, without effecting data storage device performance.

While not limiting or required, an acoustic baffle can be placed between a group of data storage devices and at least one cooling feature that used to cool the entirety of the hardware, such as a controller, memory, and data storage devices, within the enclosure. An acoustic baffle can span the interior areal extent of a plenum region of the data storage enclosure with portions of the baffle filled with one or more types of foam. Portions of the baffle can be angled and shaped to redirect and absorb acoustic energy in the form of acoustic waves without significantly disrupting airflow, which reduces or eliminates direct impact between the acoustic energy from the cooling feature(s) to prevent performance degradation of data storage device performance.

It is noted that use of an acoustic baffle moves cooling fans further from data storage devices in a data storage enclosure, which can help data storage performance. However, the plenum size needed to bring cooling air to the data storage devices make a data storage enclosure practically unusable in many rack-based storage environments. Hence, an acoustic baffle, in various embodiments, is tuned for shape, size, and airflow geometry to allow a relatively small plenum to be used and the data storage enclosure to be small enough to be used in nearly all data storage environments, particularly rack-mounted storage environments. As such, an acoustic baffle can be employed within servers, data storage enclosures, and storage servers, without limitation.

It is noted that "sound pressure level" (SPL) is meant as a pressure disturbance whose intensity is influenced by the strength of the source, shape of the surroundings, and distance from the source. Sound pressure can be measured by sound meters in dB and induces vibration and movement in objects encountering the acoustic energy. In assorted embodiments, an acoustic baffle is constructed to decrease the sound pressure level of moving air without decreasing the cooling capability of the moving air.

Figure 1:
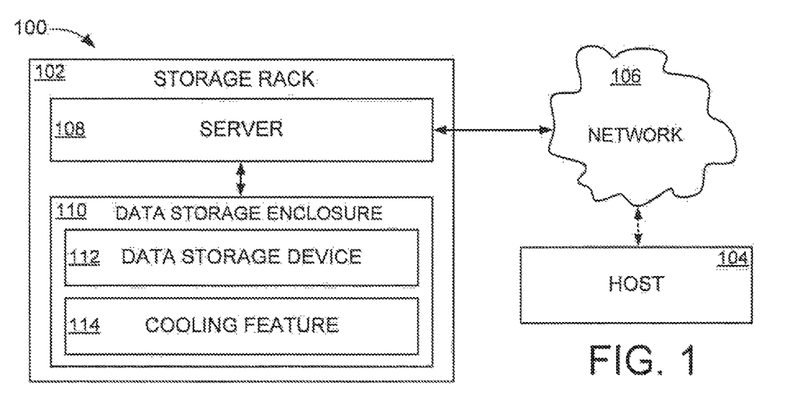
FIG. 1 is a block representation of an example data storage system arranged in accordance with various embodiments.

FIG. 1 is a block representation of an example data storage system 100 in which various embodiments of the present disclosure can be employed. The data storage system 100 can connect one or more storage racks 102 with a remote host 104 via wired and/or wireless network(s) 106 to allow the local and remote generation and storage of data. As shown, a storage rack 102 can have a server 108 that directs data to, and from, at least one data storage enclosure 110 physically supported by the storage rack 108. While a rack 102 and server 108 configuration is shown in FIG. 1, an acoustic baffle may alternatively be applied within a server, data storage enclosure, and storage server.

Although a data storage enclosure 110 can be configured to be a diverse variety of sizes and performance capabilities, some embodiments position a plurality of data storage devices 112 in the data storage enclosure 110 to be convectively cooled via one or more cooling feature(s) 114. It is noted that the data storage devices 112 can be similar or dissimilar types, capacities, and physical positions within the data storage enclosure. Likewise, one or more cooling features may be concurrently employed with different types, cooling capabilities, and orientations with respect to the data storage devices 112. The ability to selectively utilize diverse data storage device 112 and cooling feature 114 configurations allows the data storage enclosure 110 to be customized to a wide variety of data storage demands, such as cloud computing, archive data storage, and online digital content streaming.

Figure 2:
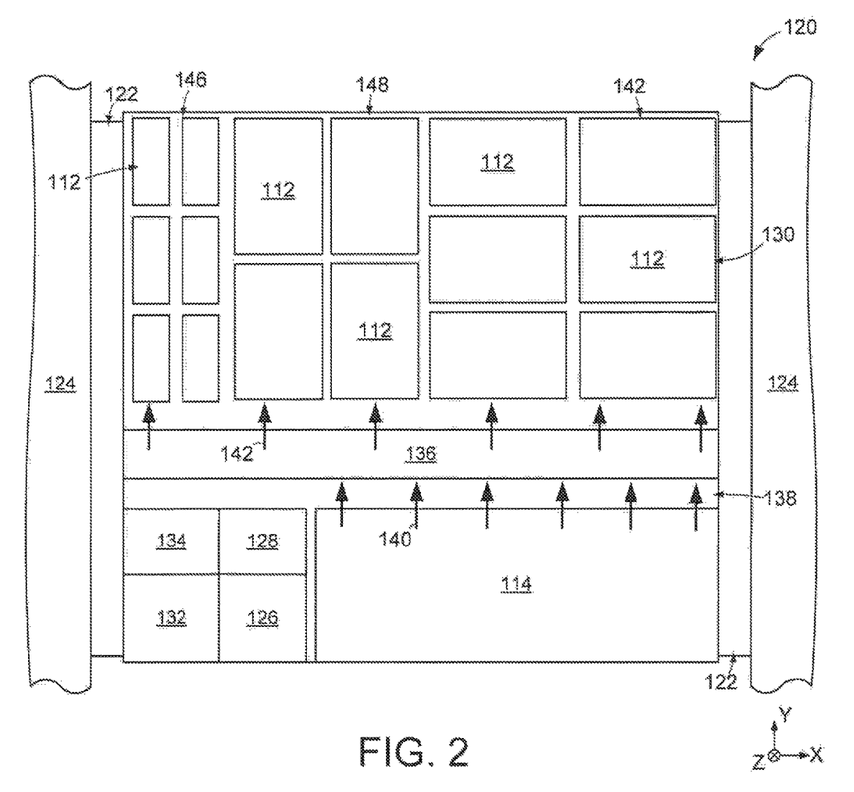
FIG. 2 shows a top view representation of an example data storage rack capable of being used in the data storage system of FIG. 1.

FIG. 2 illustrates a top view line representation of a portion of an example data storage rack 120 that can be utilized in the data storage system 100 of FIG. 1. The data storage rack 120 can support a number of data storage enclosure(s) 110 that has a rigid, or semi-flexible, frame. Any number of support rails 122 can extend from the data storage enclosure 110 to physically attach to the rack supports 124. It is noted that the support rails 122 may be configured to allow selective insertion, electrical connection, and removal of the data storage enclosure 110 relative to the rack supports 124.

The data storage enclosure 110 can incorporate at least one local controller 126, such as a microprocessor, and local memory 128, such as volatile and/or non-volatile solid-state memory to coordinate and direct operations within the enclosure 110. For instance, the controller 126 and memory 128 can monitor data capacity of the various separate data storage devices in the data storage region 130, power consumption supplied by the local power supply 132, and at least one environmental condition, such as temperature, humidity, and vibration, with one or more sensors 134 positioned within the enclosure 110. The ability to continuously or sporadically monitor a variety of different operating parameters within the enclosure 110 allows for intelligent activation of one or more cooling features 114 to maintain a predetermined data storage device operating temperature range without unduly draining power or inducing vibration in the enclosure 110.

In order to accommodate increased numbers of data storage devices 112 being packaged together in the data storage region 130, greater numbers and/or more powerful cooling features 114 are employed. However, even intelligent cooling feature 114 control may not mitigate the production of sound pressure by the cooling features 114 and the effects of that sound pressure on the assorted data storage devices 112. In other words, the cooling capabilities needed to maintain the high number of data storage devices 112 at optimal operating temperatures often produce sound pressures that vibrates the data storage devices 112 enough to degrade data storage performance, which can be characterized as "acoustic performance degradation."

Hence, various embodiments positions at least one acoustic, baffle 136 in a plenum 138 region of the enclosure 110 to decrease the sound pressure level from the cooling feature 114 to the data storage devices 112, as illustrated by high sound pressure level arrow 140 proximal the cooling feature 114 and low sound pressure level arrow 142 proximal the data storage devices 112. The acoustic baffle 136 continuously extends throughout the interior dimensions of the plenum region 138 to contact bottom and top enclosure surfaces along the Z axis as well as left and right surfaces along the X axis.

By filling at least a portion of the plenum region 138 with the acoustic baffle 136, the direct impact of the sound pressure level produced by the cooling feature(s) 114 on the data storage devices 112, which decreases vibrations, errors, and stress on the enclosure 110 and the respective data storage devices 112. With various embodiments of the acoustic baffle 136, the baffle is independent of airflow and can be used in either fan-pull or fan-push airflow environments due to acoustic noise being independent of airflow direction.

It is noted that the various data storage devices 112 can be packaged in the storage region 130 in an unlimited variety of manners. For example, a midplane printed circuit board can be added between the data storage devices 112 and the acoustic baffle 136. Acoustic dampening material, in some embodiments, is positioned in some, or all, of the plenum space, such as long the top, bottom, and sidewalls of the plenum region 138, to further reduce acoustic emissions from the cooling feature(s) 114.

As another example, the storage devices 112 can be oriented with a longitudinal axis aligned horizontally (X axis), as shown in column 144, with a longitudinal axis aligned vertically (Z axis), as shown in column 146, or with a longitudinal axis aligned transverse (Y axis), as shown in column 148. It is contemplated that the orientation of the assorted data storage devices 112 can be tuned with respect to the material and shape of the acoustic baffle 136 to provide ample cooling to the data storage devices 112 with decreased sound pressure levels.

Figure 3A:
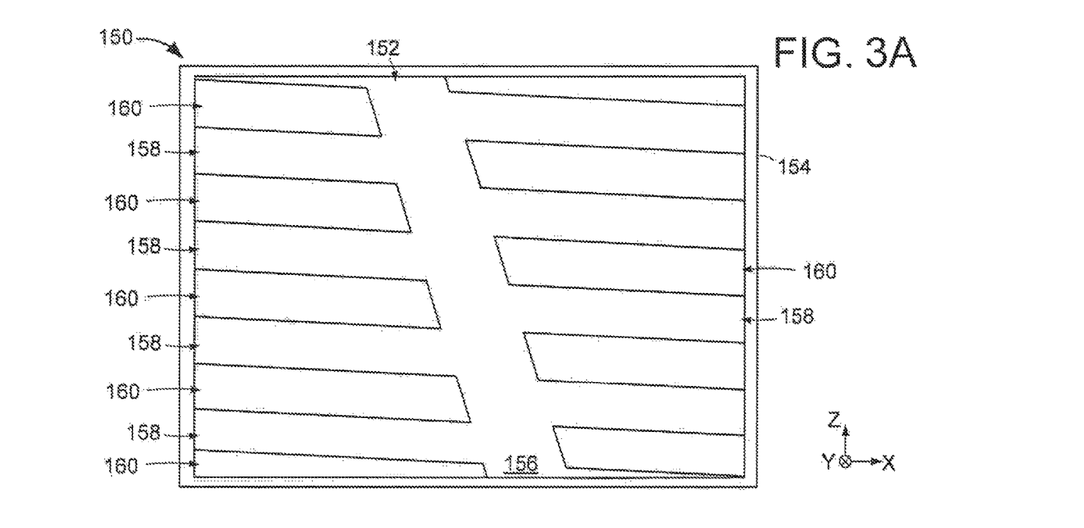
FIGS. 3A & 3B respectively depict line representations of an example acoustic baffle that may be employed in the data storage system of FIG. 1.
Figure 3B:
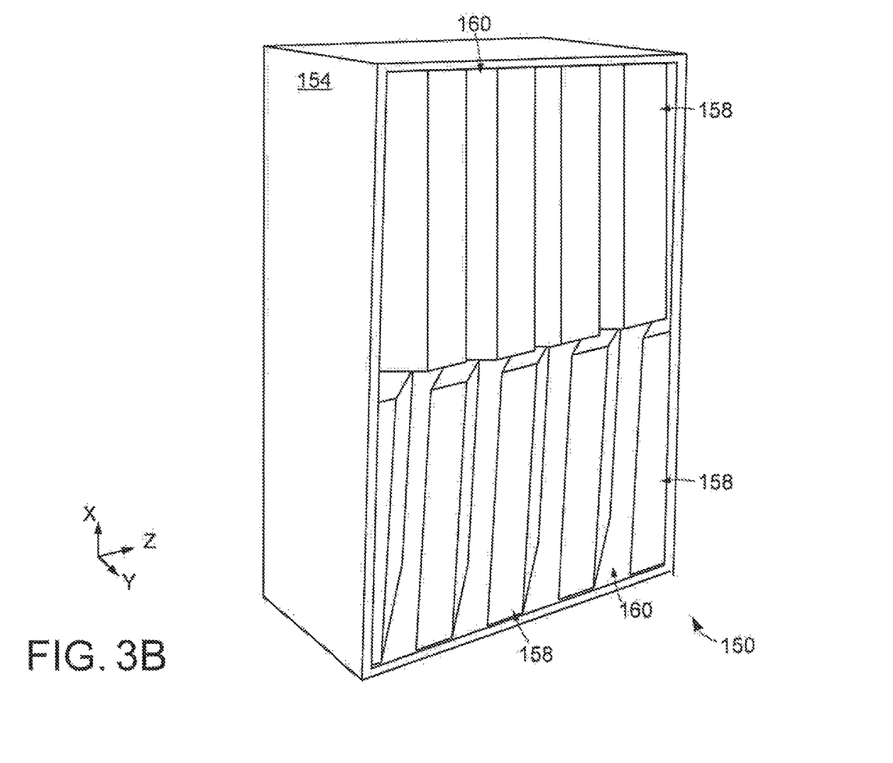

FIGS. 3A and 3B respectively display different line representation views of an example acoustic baffle 150 that may be employed alone, or in combination with another acoustic baffle, in a data storage enclosure 110 and system 100. In the front view of FIG. 3A, an insert 152 occupies the interior of a baffle housing 154. Although not limiting, the insert 152 can be a singular piece of material, such as a closed-cell foam, open-cell foam, rubber, polymer, or ceramic, that is secured in the baffle housing 154 with adhesive and/or fastener(s). The insert 152, in other embodiments, comprises a plurality of dissimilar materials that occupy the interior of the baffle housing 154.

The insert 154 shown in FIG. 3A has a central column 156 that is tilted at a non-normal, non-zero angle with respect to the Z-X plane. Several protrusions 158 extend from the central column 156 and are respectively separated by apertures 160. With reference to the perspective view of FIG. 3B, the respective protrusions 158 are tilted at non-normal and non-zero orientations with respect to the Z-X plane so that there is no direct pathway through the baffle 150 for sound to pass unimpeded. That is, protrusions 158 on the left side of the baffle 150 are tilted downward at one or more angles while protrusions 158 on the right side of the baffle 150 are tilted upward at one or more angles so that sound pressure levels are absorbed and diffused without decreasing the cooling capabilities of the moving air.

Figure 4A:
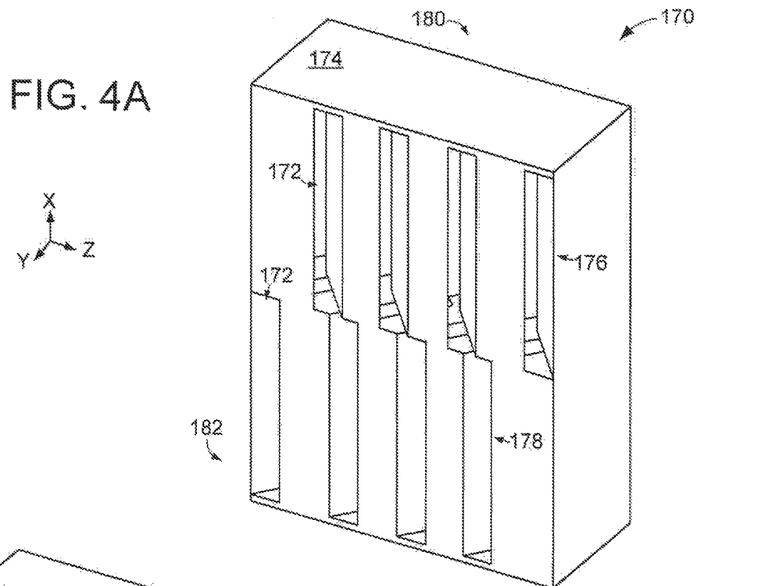
FIGS. 4A & 4B respectively are line representations of an example acoustic baffle suitable for use in the data storage system of FIG. 1.
Figure 4B:
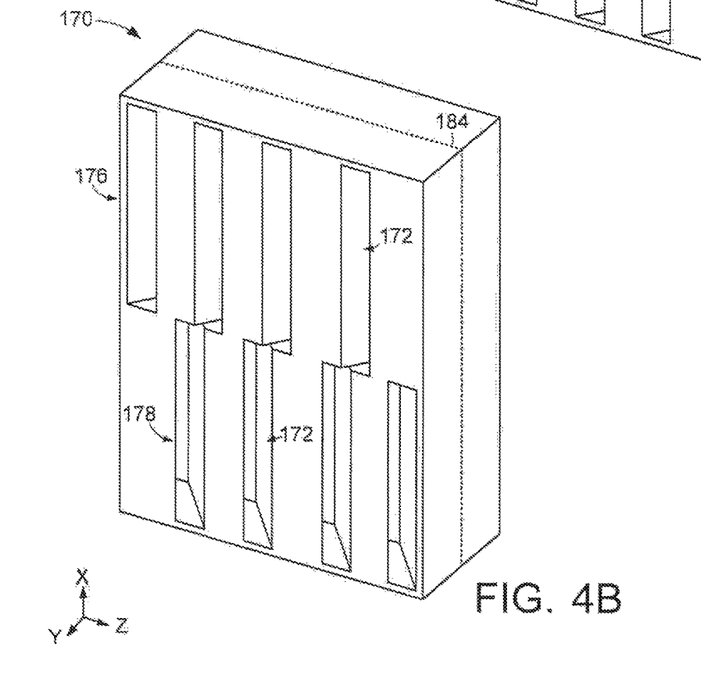

The ability to tune the shape, size, and position of portions of the insert 152 in different configurations allows the acoustic baffle 150 to be customized to the available space and cooling requirements of a data storage enclosure 110. FIGS. 4A and 4B respectively illustrate line representations of an example acoustic baffle 170 that may be used alone, or in combination with other acoustic baffles in accordance with various embodiments. It is noted that the acoustic baffle 170 does not require a housing and instead can be constructed as a single structure that can be mounted within a data storage enclosure without a baffle housing. However, a housing may be employed to contact some, or all, of the periphery of the baffle 170.

The front perspective view of FIG. 4A displays how insert apertures 172 continuously extend through the insert body 174. The apertures 172 of a first region 176 are each angled to divert moving air downward, along the Z axis, while the apertures 172 of a second region 178 are angled to divert moving air upward, along the Z axis. The different aperture 172 configurations of the first 176 and second 178 regions operates to decrease acoustic intensity, which corresponds with lower sound pressure levels on the downstream side 180 of the acoustic baffle 170 than on the upstream side 182.

Figure 5A:
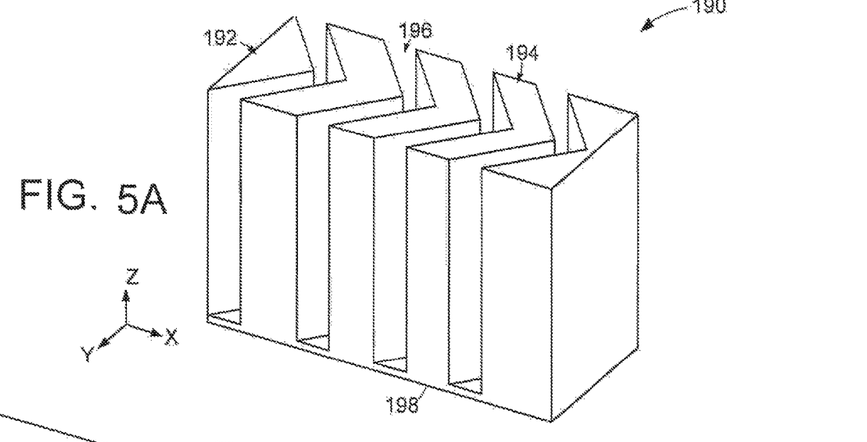
FIGS. 5A-5C respectively display line representations of an example acoustic baffle capable of being utilized in the data storage system of FIG. 1.
Figure 5B:
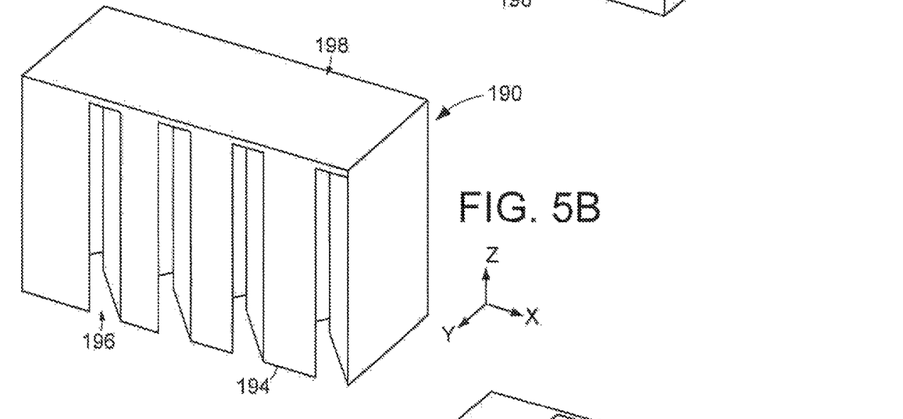
Figure 5C:
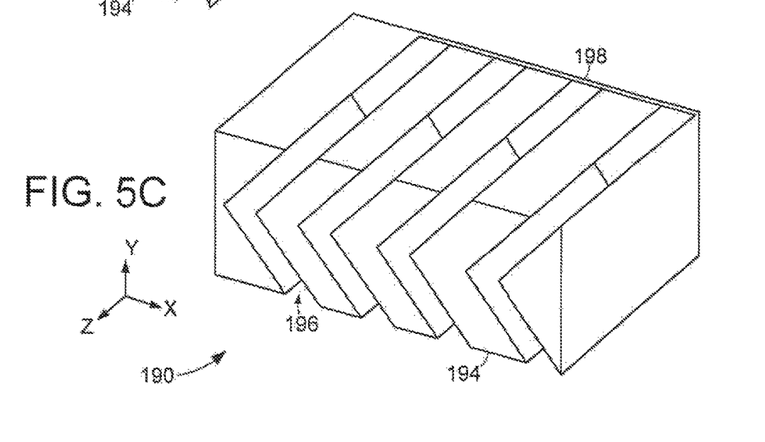

The rear perspective view of FIG. 4B illustrates how the baffle 170 can be a mirror image about its mid-plane 184. The separation of air into the respective apertures 172 that are angled at different orientations operates to disrupt acoustic energy without degrading the convective capabilities of the air flow. Although each aperture 172 extends linearly through the insert body 174 at a single angle, such configuration is not required. FIGS. 5A-5C respectively convey line representations of portions of an example acoustic baffle 190 that can be employed in a data storage enclosure 110 in accordance with assorted embodiments.

FIG. 5A displays how a single insert body 192 is segmented into protrusions 194 separated by air passages 196. The air passages 196 differ from apertures 160 and 172 by being shaped to move air in multiple different directions through the body 192. As shown, each air passage 196 continuously extends through the body 192 with a substantially V shape defined by multiple different linear directions, which can decrease acoustic intensity and sound pressure levels while allowing moving air to efficiently pass.

In some embodiments, at least one air passage 196 has a curvilinear side wall, such as a bend or substantially S shape. Other embodiments configure the interior sidewalls of at least one air passage 196 with one or more different textures, such as smooth, dimpled, or spiked, to promote laminar airflow through the baffle 190 and reduce acoustic-born performance loss. It is contemplated that an air passage 196 can be combined with a linear apertures 160/172. It is further contemplated that an air passage 196 is partially or completely lined with a dissimilar material, such as a polymer or metal, that ensures the cooling capabilities of moving air are maintained while acoustic energy is dissipated by the acoustic baffle 190.

FIG. 5B shows how each protrusion 194 can be cantilevered from a body base 198. The body base 198 can provide a convenient mounting surface for the baffle 190 to the housing of a data storage enclosure 110. The top view of FIG. 5C displays another perspective of the various protrusions 194 and air passages 196. With some embodiments, the various air passages 196 can be configured differently, such as with wider openings and/or thinner protrusions 194. The ability to customize the protrusions, apertures, and air passages of an acoustic baffle, as displayed in FIGS. 3A-5C, allows an acoustic baffle to provide an optimized balance of acoustic diffuser and air deflector that can distribute convective cooling throughout a data storage region of a data storage enclosure.

Figure 6:
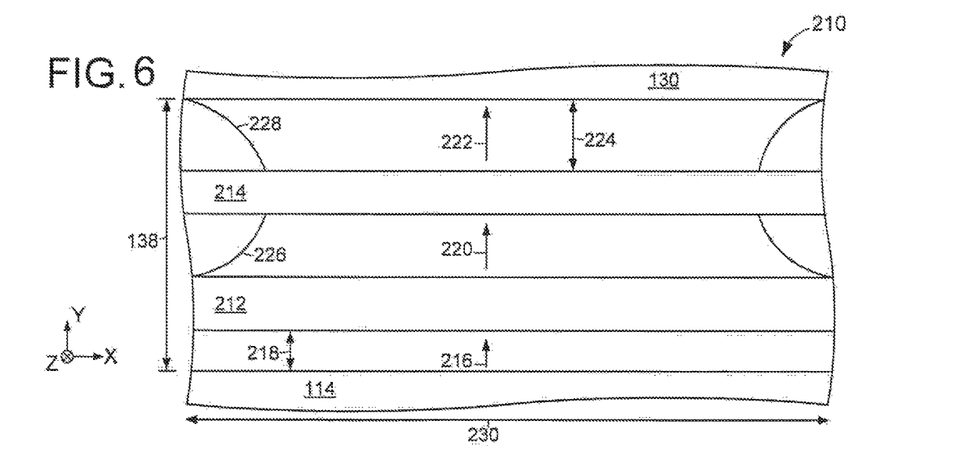
FIG. 6 illustrates a top view line representation of a portion of an example data storage enclosure configured in accordance with various embodiments.

FIG. 6 illustrates a top view line representation of a portion of an example data storage enclosure 210 that employs multiple acoustic baffles 212 and 214 in accordance with some embodiments. The acoustic baffles 212 and 214 are each positioned in a plenum region 138 of the enclosure 210 that is defined by the distance between the cooling feature(s) 114 and the data storage region 130. Moving air that has a high SPL, such as above 50 dB represented by high SPL arrow 216, as a result of acoustic energy generated by the cooling feature(s) 114 travels a first cooling distance 218 to the first acoustic baffle 212 where the SPL is decreased to an intermediate SPL, as represented by arrow 220.

It is contemplated that the first acoustic baffle 212 reduces SPL of moving air without decreasing the velocity of the air towards the data storage region 130. That is, the first acoustic baffle 212 can redirect and diffuse moving air to decrease the acoustic intensity (SPL) without reducing the velocity or density of the air. The first acoustic baffle 212 can be complemented by the second acoustic baffle 214 that further reduces the SPL of the moving air to a low SPL level, as represented by arrow 222. The low SPL moving air can then move a tuned distance 224 to the data storage devices arranged in the data storage region 130. The tuned distance 224 can allow the air to distribute evenly across the width of the plenum region 130, along the X axis, so that the data storage devices receive uniform cooling.

While not required, various embodiments position air deflectors proximal one, or both, acoustic baffles 212/214. As shown, a first air deflector 226 can funnel air to less than the entire width of the second acoustic baffle 214 and a second air deflector 228 can subsequently channel air outwardly throughout the tuned distance 224. Either air deflector 226/228 can be configured with ridges, notches, and varying elevations to induce and maintain air flow from the cooling feature(s) 114 to the data storage region 130.

The respective acoustic baffles 212 and 214 can be configured similarly, or dissimilarly, to provide a low SPL 222 conducive to optimized data storage device operation. For instance, the first acoustic baffle 212 may be constructed of a different material, with a different insert design, and with a different size than the second acoustic baffle 214. As another non-limiting example, the first acoustic baffle 212 may have a larger, or smaller, air flow distribution relative to the width 230 of the enclosure 210, which can be complemented by the use of one or more air deflectors 226/228.

In some embodiments, the first acoustic baffle 212 is positioned in a cooling feature 114. That is, an acoustic baffle can be in contact with a cooling fan housing so that acoustic energy (SPL) produced by the cooling fan is immediately diffused, absorbed, and/or suppressed. Such in-fan acoustic baffling can correspond with a zero first cooling distance 218 and baffle apertures sized to match the output flow of a fan. The use of in-fan acoustic baffling can minimize the risk of air turbulence that can inadvertently increase SPL of cooling air downstream from the cooling features 114.

Figure 7A:
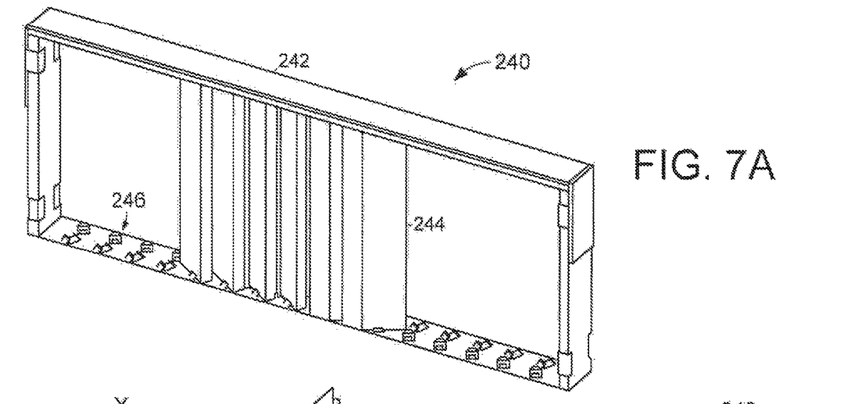
FIGS. 7A and 7B respectively show line representations of portions of an example acoustic baffle that may be employed in the data storage system of FIG. 1
Figure 7B:
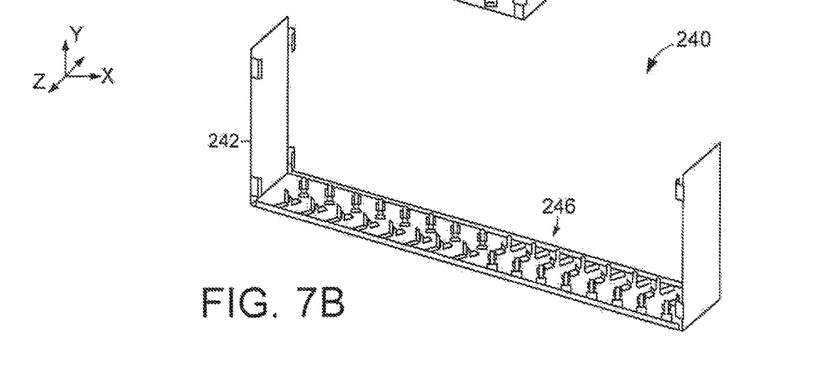

FIGS. 7A and 7B respectively convey line representations of an example acoustic baffle 240 that employs a baffle housing 242 that secures a number of baffle panels 244 with selectable tabs 246. The baffle panels 244 can be arranged in a variety of different orientations by manipulating the various tabs 246 to contact and secure the panels 244 in a predetermined orientation in the housing 242. In the non-limiting example of FIG. 7A, the panels 244 are tilted at different angles within the housing 244, as dictated by the configuration of the tabs 246.

FIG. 7B shows a bottom portion 248 of the baffle housing 242, which illustrates how the housing 242 can comprise multiple interconnected portions to secure the baffle panels 244. The lack of baffle panels 244 in FIG. 7B displays how the selectable tabs 246 can be positioned throughout the housing 242 and individually manipulated position panels 244 in a fixed position.

Figures 8A, 8B:
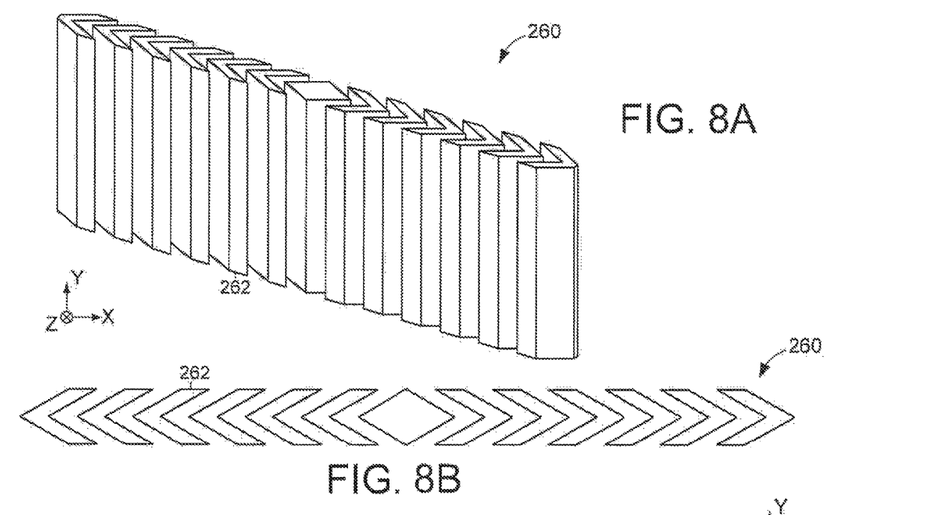
FIGS. 8A and 8B respectively represent portions of an example acoustic baffle arranged in accordance with some embodiments.

FIGS. 8A and 8B respectively are perspective and top view line representations of an example acoustic baffle 260 that can be used in a data storage system without being surrounded by a baffle housing, such as housing 242. That is, baffle panels 262 can be individually, or collectively, positioned in a plenum region of a data storage enclosure and secured with friction, adhesives, or fasteners. For instance, the laterally symmetric panel pattern shown in FIG. 8B can be accomplished in a plenum region by attaching each panel 262 with a fastener or adhesive or via friction between the panels and panels of the plenum region, such as the top and bottom sections of the data storage enclosure.

Figure 9:
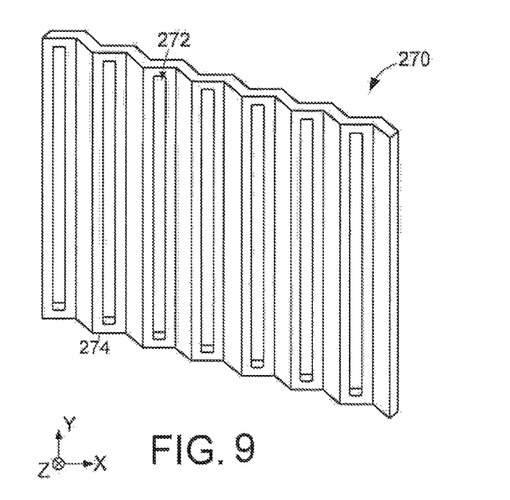
FIG. 9 conveys a line representation of a portion of an example acoustic baffle capable of being used in the data storage system 100 of FIG. 1.

FIG. 9 is a perspective line representation of another example acoustic baffle 270 that may be utilized with, or without, a baffle housing. The use of multiple airflow apertures 272 in a single continuous piece of material 274 in baffle 270 can provide different acoustic emission performance compared to other acoustic baffle configurations, such as configurations of FIGS. 3A-8B. It is contemplated that multiple different baffle collections are concurrently utilized in a single plenum region or in a common baffle housing.

Figure 10:
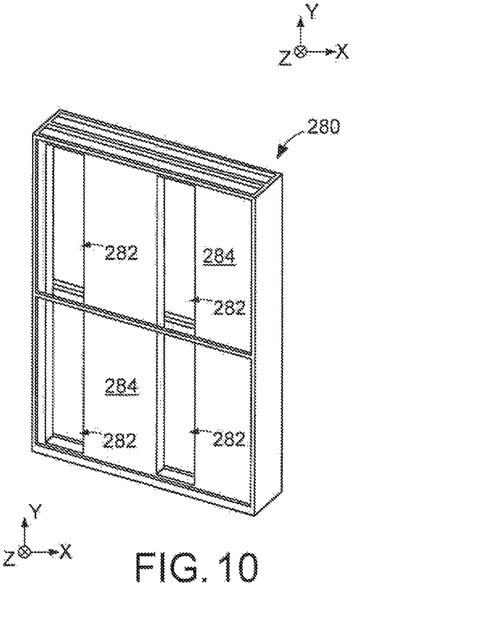
FIG. 10 displays an example acoustic baffle that can be employed in the data storage system of FIG. 1.

FIG. 10 illustrates an example acoustic baffle 280 that has interior chambers 282 defined by baffle panels 284. Tuning the baffle panels 284 can adjust the size of the interior chambers 282 and the airflow resistance of the baffle 280. As such, a plenum region can be configured with one or more baffles 280 that are customized to balance acoustic energy absorption/dissipation with the flow of cooling air from cooling features to data storage devices in a data storage enclosure.

Figure 11:
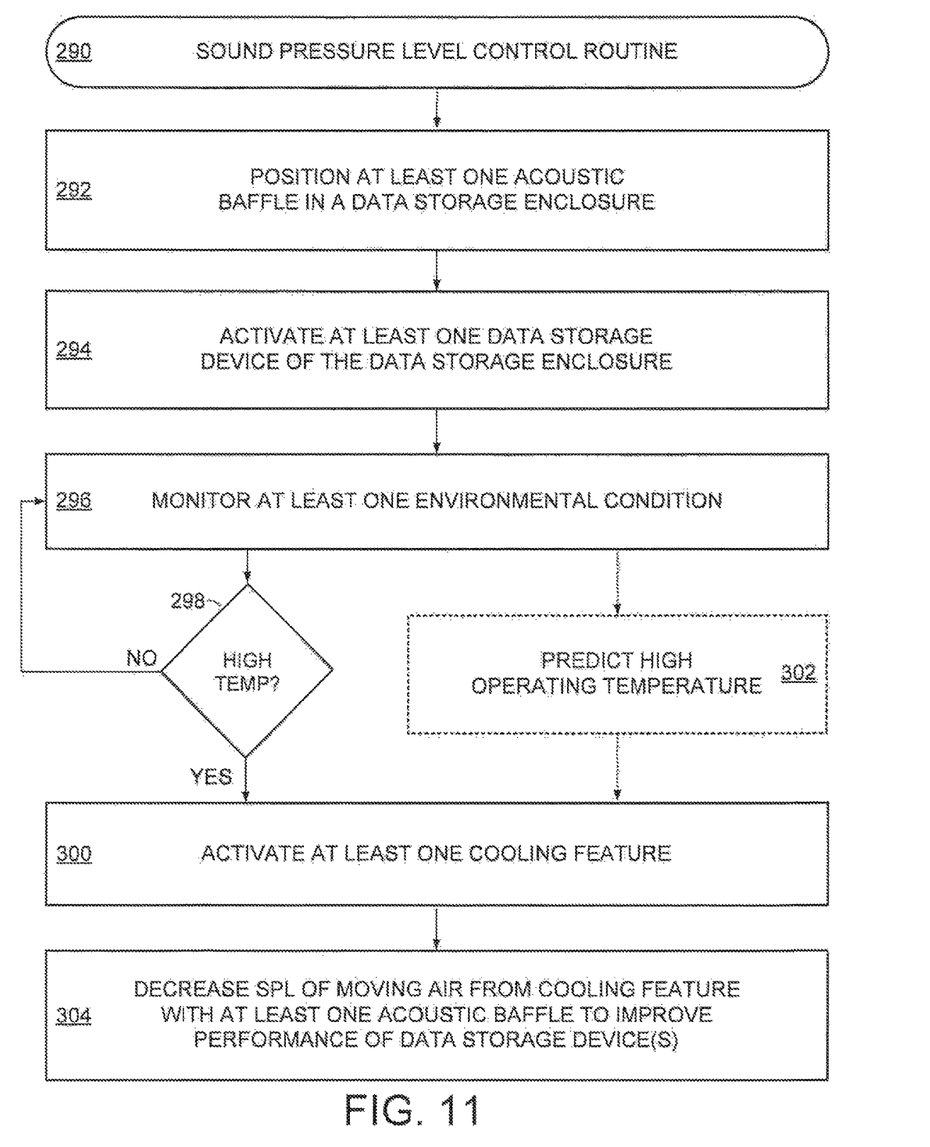
FIG. 11 provides a flowchart for an example sound pressure level control routine performed in accordance with various embodiments.

FIG. 11 depicts a sound pressure level control routine 290 that can be carried out with the various embodiments in at least one data storage enclosure as part of a data storage system. Initially, the routine 290 positions at least one acoustic baffle in a plenum region of a data storage enclosure in step 292. It is noted that step 292 can position multiple different, or matching, acoustic baffles in the plenum region as well as within, or physically contacting a fan housing. Step 294 then activates at least one data storage device to conduct data storage operations, which can entail the transfer of data into, or out of, one or data storage devices of a data storage region of the data storage enclosure. The data storage operations of step 294 can occur without any cooling features being activated or with less than all cooling features operating at full speed.

Next, step 296 monitors at least one environmental condition in the data storage enclosure, such as temperature, humidity, and vibration, with at least one sensor. It is contemplated that step 296 continually is executed during steps 292 and/or 294. With temperature being monitored by step 296, decision 298 can determine if a temperature threshold has been reached. If a sensor reads a high temperature above the threshold, at least one cooling feature is activated with step 300. Monitored temperatures can alternatively allow a controller to predict a high temperature operating environment in step 302, which triggers step 300 to activate a cooling feature.

The activation of one or more cooling features in step 300 can coincide with the suppression of SPL in step 304 with at least one acoustic baffle. That is, an initial SPL generated by a cooling feature is reduced as air moves through one or more acoustic baffles. The tuned reduction of SPL with acoustic baffling minimizes the vibration and acoustic effects of moving air on that data storage devices, which allows more powerful cooling features to be utilized compared to unbaffled data storage enclosures. Hence, the material, shape, and position of one or more acoustic baffles eliminates direct acoustic energy impact to a data storage device, thus preventing performance degradation of the data storage enclosure while providing cooled operating temperatures below a temperature threshold, such as 100° F.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A system comprising:
an enclosure housing a data storage device and a cooling feature; and an acoustic baffle positioned between the cooling feature and the data storage device, the acoustic baffle separating a first sound pressure region proximal the cooling feature from a second sound pressure region proximal the data storage device, the acoustic baffle comprising a single insert having a plurality of apertures defined by protrusions of material, each continuously extending through the single insert with each aperture of the plurality of apertures tilted with respect to a mid-plane of the single insert so that no unimpeded path for moving air through the single insert, the plurality of apertures arranged into first and second groups, the first group tilted at a different non-normal, non-zero angle than the second group with respect to a mid-plane of the single insert.

2. The system of claim 1, wherein the enclosure houses a plurality of data storage devices and a plurality of cooling features.

3. The system of claim 1, wherein the acoustic baffle continuously extends to occupy an entire width of the enclosure.

4. The system of claim 1, wherein the enclosure is secured within a data storage rack.

5. The system of claim 1, wherein acoustic baffle comprises at least one insert secured within a baffle housing, the baffle housing continuously extending to surround a periphery of the at least one insert.

6. The system of claim 1, wherein the acoustic baffle comprises a foam material.

7. The system of claim 1, wherein the acoustic baffle comprises a plurality of different materials.

8. An apparatus comprising an enclosure housing a data storage device separated from a cooling feature by a plenum region of the enclosure, first and second acoustic baffles each positioned in and separated from each other in the plenum region by an air deflector configured to funnel air to less than an entire width of the second acoustic baffle, each acoustic baffle configured to continuously span a width of the plenum region so that air passes through apertures defined by protrusions of material, the first acoustic baffle having a different aperture configuration than the second acoustic baffle, the first acoustic baffle comprising a first group of apertures angled to divert airflow toward a first direction and a second group of apertures angled to divert airflow toward a second direction, opposite the first direction, the first and second groups of apertures each positioned in, and extending through, a single body of material, the first acoustic baffle separating a first sound pressure region proximal the cooling feature from a second sound pressure region, the second acoustic baffle separating the second sound pressure region from a third sound pressure region proximal the data storage device.

9. The apparatus of claim 8, wherein the first sound pressure region is greater than the second and third sound pressure regions, the second sound pressure region being greater than the third sound pressure region.

10. The apparatus of claim 8, wherein the cooling feature is a fan having a fan housing.

11. The apparatus of claim 10, wherein the first acoustic baffle contacts the fan housing.

12. The apparatus of claim 8, wherein the first acoustic baffle has a first plurality of apertures arranged in a first pattern and the second acoustic baffle has a second plurality of apertures arranged in a second pattern, the first and second patterns being different.

13. The apparatus of claim 8, wherein the first acoustic baffle comprises a first material and the second acoustic baffle comprises a second material, the first and second materials being different.

14. The apparatus of claim 8, wherein a deflector is positioned between the first and second acoustic baffles.

15. A method comprising:
positioning an acoustic baffle between a data storage device and a cooling feature in a data storage enclosure, the acoustic baffle comprising a first group of apertures angled to divert airflow toward a first direction and a second group of apertures angled to divert airflow toward a second direction, opposite the first direction, the first group of apertures separated from the second group of apertures, the first and second groups of apertures each positioned in, and extending through, a single body of material, the first group of apertures arranged as a mirror image about a midplane of the single body of material;
activating the cooling feature to move air and create a first sound pressure level proximal the cooling feature; and
reducing the first sound pressure level to a second sound pressure level with the acoustic baffle, the second sound pressure level being proximal the data storage device.

16. The method of claim 15, wherein the cooling feature is activated in response to a predicted operating temperature for the data storage device.

17. The method of claim 15, wherein the cooling feature is not activated until a sensor detects an operating temperature in the data storage enclosure is above a predetermined threshold.

* * * * *